Sept. 8, 1953                D. R. CLEMONS                2,651,101
           METHOD OF MANUFACTURING ELECTROSTATIC CONDENSERS
Filed Oct. 25, 1944                                 2 Sheets-Sheet 1
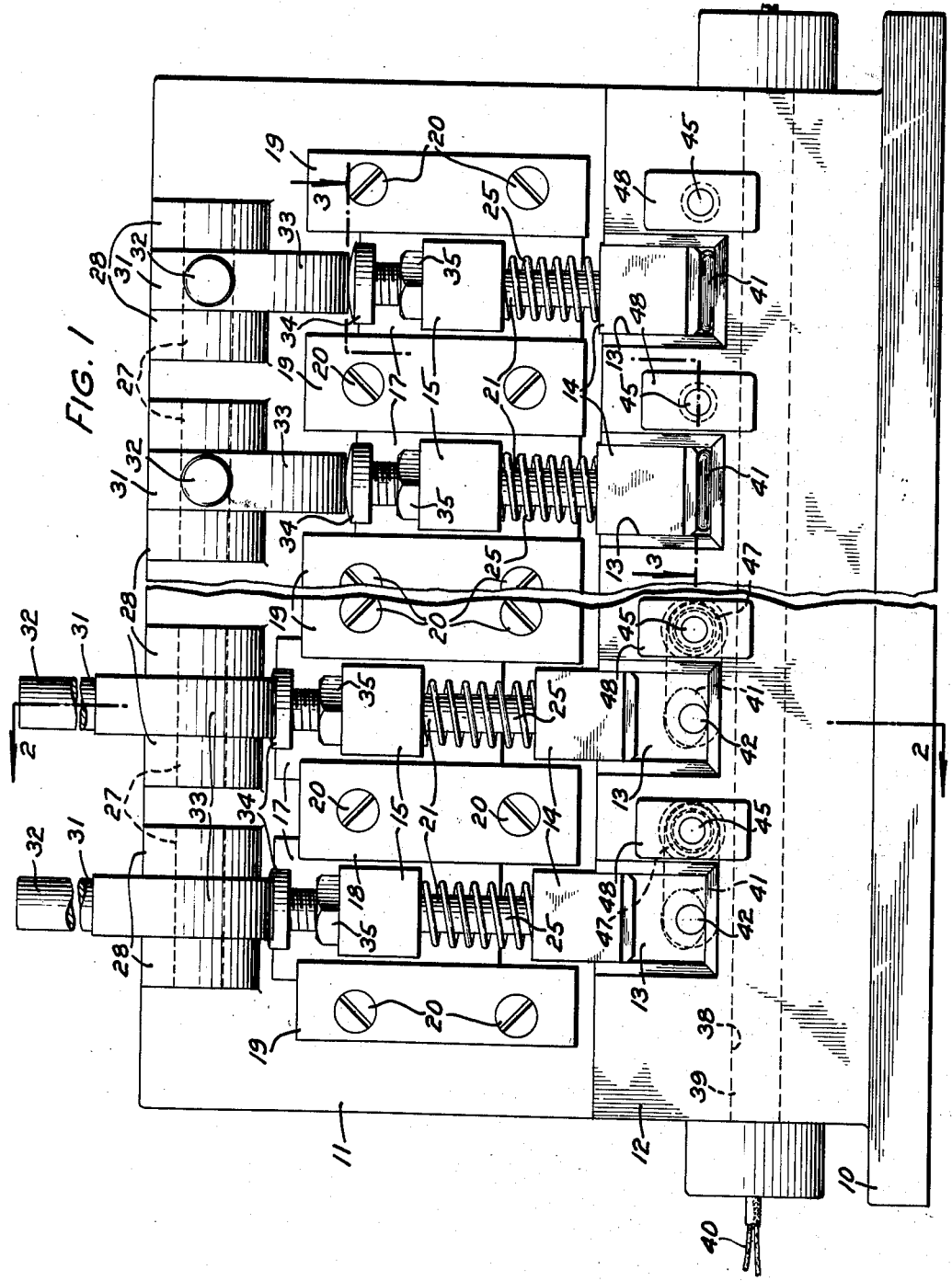
INVENTOR
D. R. CLEMONS
BY
ATTORNEY

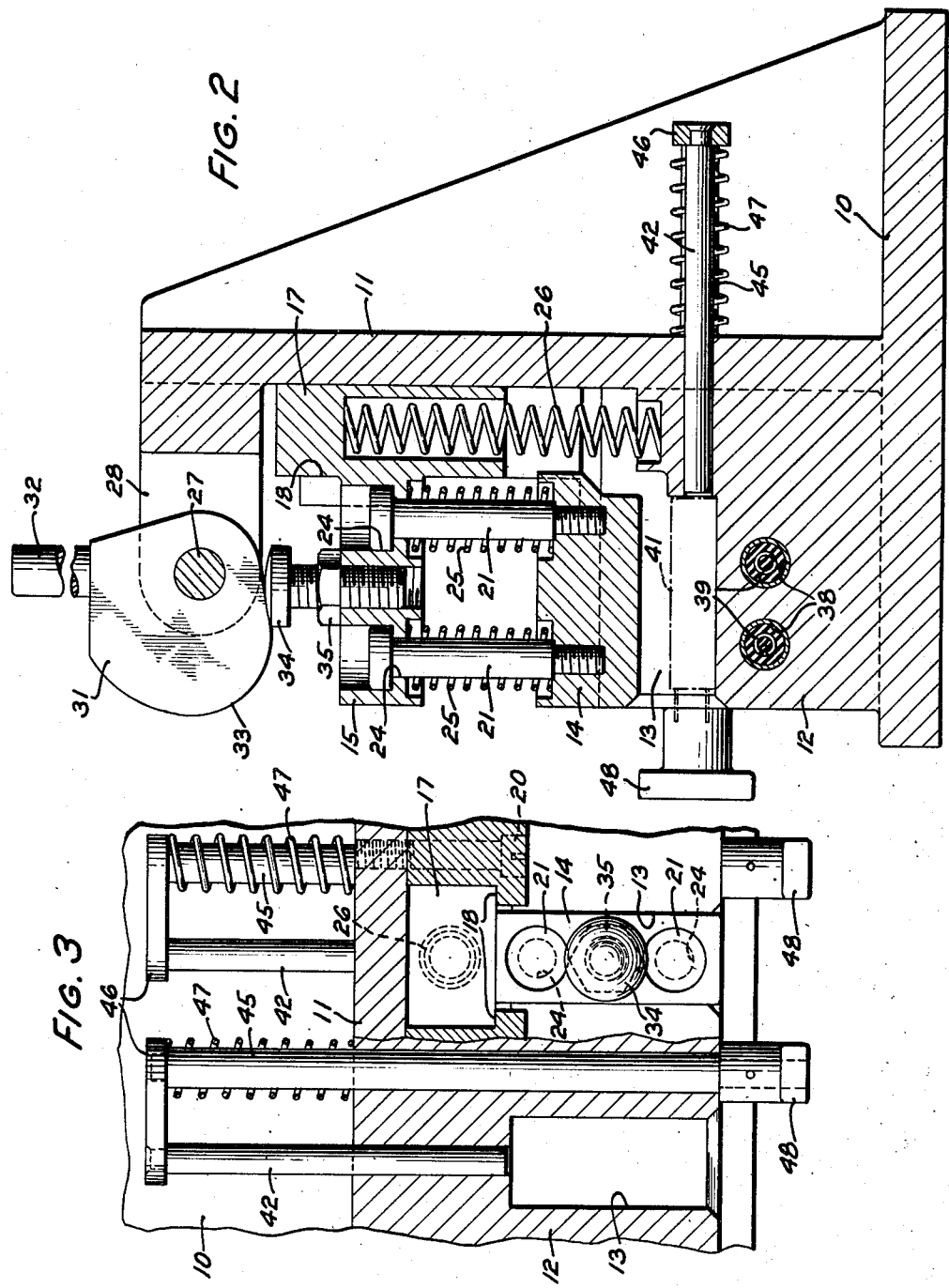

Patented Sept. 8, 1953

2,651,101

UNITED STATES PATENT OFFICE 2,651,101

METHOD OF MANUFACTURING ELECTROSTATIC CONDENSERS

Dale R. Clemons, Riverside, Ill., assignor to Western Electric Company, Incorporated, New York, N. Y., a corporation of New York Application October 25, 1944, Serial No. 560,302

4 Claims. (Cl. 29—25.42)

1

This invention relates to a method of manufacturing electrostatic condensers and more particularly to a method of manufacturing electrostatic condensers of the paper and metal foil rolled type.

In the manufacture of condensers of the above-referred-to type, particularly condensers requiring final close limit electrical capacity values, it has been the practice, in some instances, to apply a preliminary pressure simultaneously to a plurality of freshly rolled condensers arranged in layers, under heavy spring pressure in a rack with metallic plates disposed between each layer, by mounting the rack in an air actuated press and subjecting them to heavy pressure. Thereafter, the rack is removed from the press and while such pressure is maintained, by means of inserted wedge blocks, the condensers are subjected to baking or dehydrating in an oven for a considerable period of time at a high temperature, at times under vacuum, to minimize the effect of moisture in making the final pressure adjustments of capacity before sealing in cans. This practice has necessitated the use of racks, springs, plates, air presses, wedge blocks and a large oven for baking the racked condensers while under heavy pressure. Also needed are desiccators for temporarily cooling and storing the treated condensers for a considerable period of time. To insure the best results, prompt assemblage of the condensers after baking is advisable to minimize the effects of absorbed moisture, which is absorbed rather rapidly during certain seasons of the year, and which may affect the accuracy of capacity control adjustments in the final assemblage.

Objects of this invention are to provide a simple, efficient and practicable method of rapidly producing high precision condensers of maximum uniform capacity for a given size and weight of material.

One embodiment of the invention contemplates the provision of a method of manufacturing high precision uniform capacity electrostatic condensers in which measured lengths of foil and paper are interwound and the unit individually compressed and simultaneously heated within embracing heated metallic members under a pressure on the order of one hundred pounds per square inch and a temperature on the order of 400° F. to compress and bake or dehydrate the wound unit. Immediately thereafter, the preformed and dried condenser unit or units are sealed while still warm in a container.

A more complete understanding of the invention may be had from the following detailed description when read in conjunction with the accompanying drawings, in which Fig. 1 is a front elevational view, partly broken away to conserve space, of a multiple unit compressing and heating apparatus used in practicing a method embodying the features of the invention for individually treating rolled condenser units;

Fig. 2 is a vertical section taken on the line 2—2 of Fig. 1; and

Fig. 3 is a horizontal section taken on the line 3—3 of Fig. 1.

The apparatus for pressing and drying each condenser individually, as disclosed in the drawings, comprises a metal frame 10, which may rest upon a conventional type shop workbench (not shown). Extending forward from a vertical wall 11 is a relatively thick base portion or block 12 having formed in its upper portion a plurality of condenser unit receiving cavities 13, which are open at their tops and forward ends. In intimate sliding contact in each of the cavities 13 is a pressing head 14, each of which is yieldably supported from a horizontal arm 15 of an individual platen or slide 17 guided in slideways 18 formed on plates 19 secured by screws 20 to the vertical frame wall 11. Each head 14 and its slide 17 is yieldably connected together by a pair of shouldered screws 21, threaded at their lower ends into the head 14 and freely slidable at their upper ends in shouldered apertures 24 formed in the slide 17, a coiled compression spring 25 surrounding the screw and abutting at opposite ends recessed surfaces in the head 14 and the arm 15 serve to maintain the head in its normal lowered position upon the slide 17 when the slide is in its normal upper position. A coiled compression spring 26, having its opposite ends lodged in depressions provided in the frame 10 and the slide 17, serve to maintain the slide in its normal upper position, as shown at the right side of Fig. 1 and also in Fig. 2.

In order to lower the heads 14, the following operating mechanism is provided individually for each head. Pivoted at 27 between a pair of arms 28 extending horizontally from the vertical frame wall 11 is a cam member 31 equipped with a hand lever 32. The cam member 31 is aligned with the head 14 and slide 17 and its cam face 33 is constantly engaged with an arcuate upper face of an adjustable screw 34 threaded into the slide arm 15, a lock nut 35 maintaining the screw in its adjusted position. In Fig. 2, the head 14 is in its upper retracted position with the hand lever 32 in its vertical position. To lower the head 14, the hand lever 32 is rocked counterclockwise (Fig. 2), whereupon the cam face 33 of the cam member 31 riding upon the upper face of the screw 34 depresses the slide 17 against the action of the spring 26 and carrying therewith the yieldably connected head 14. In operation the cam arrangement and the springs 25 are such that the heads 14 are forced into contact with a condenser unit under a pressure of substantially one hundred pounds per square inch of condenser area.

Formed in the block 12 are two horizontally extending apertures 38, in each of which are sealed suitable electrical heating units 39 connected to a suitable source of electrical energy by conductors 40. The block 12 is maintained at a temperature of 400° F. and since the slidable head 14 is in intimate contact with the opposite vertical walls of the cavity 13 in the block 12, it is also heated to substantially 400° F.

Rolled condenser units, indicated in broken outline at 41—41, shown within the left hand cavities 13—13 of Fig. 1, and also as shown in Fig. 2, may be placed therein by means of a suitable hand tool, and, upon completion of the compressing and baking thereof, are ejected from the cavities 13 by means of an ejector comprising a rod 42 slidably carried in the frame 10 above the block 12 and arranged to engage the inner end of the compressed and baked condenser unit 41 and slide the same out of the cavity and onto a receiving platform (not shown). In order to actuate the ejector rod 42, it is connected at its rear end, which extends from the vertical frame wall 11, to a parallel actuator rod 45, also slidable in the frame 10, by a cross member 46. The ejector rod 42 and its actuator rod 45 are normally maintained in their inoperative position, as shown in the drawings, by means of a coiled compression spring 47 surrounding the rod 45 with its opposite ends abutting the member 46 and the vertical frame wall 11. A handle 48 on the forward end of the rod 45 (Figs. 1 and 3) arranged to engage the front vertical wall of the block 12 serves as a stop for the connected rods 42 and 45 under the urging of the spring 47.

In practicing the method of producing the condensers 41 in accordance with this invention, measured lengths of foil and paper are interwound in a well-known usual manner and manually flattened slightly. The rolled condensers are preferably immediately conveyed directly to the apparatus herein described, where each condenser is uniformly individually compressed and simultaneously heated under a pressure on the order of one hundred pounds per square inch and a temperature on the order of 400° F. and for a period on the order of two and one-half minutes to compress and bake or dehydrate the wound unit. Thereafter, the condenser units are predeterminedly assembled together to provide the desired capacity and retained by suitable clamps with the required insulation therebetween and then vacuum dried and impregnated. After making final pressure adjustments of capacity, the assemblage of condenser units is sealed in a container with a potting compound.

What is claimed is:

1. The method of making condensers, which comprises applying to a plurality of rolled condensers sufficient pressure to flatten the condensers and stabilize the shapes and capacities thereof, heating the condensers while they are under pressure sufficiently to remove most of the moisture included therein, releasing the pressure on the condensers, assembling under pressure the condensers while they are still hot in combinations of a predetermined capacity, simultaneously heating the stacked condensers and applying vacuum thereto to remove the remainder of the moisture therein, impregnating the stacked condensers, and potting the stacked condensers.

2. The method of making condensers, which comprises applying individually to a plurality of rolled condensers sufficient pressure to flatten the condensers and stabilize the shapes and capacities thereof, heating the condensers while they are under pressure sufficiently to remove most of the moisture included therein, releasing the pressure on the condensers, assembling under pressure the condensers while they are still hot in combinations of a predetermined capacity, simultaneously heating the stacked condensers and applying vacuum thereto to remove the remainder of the moisture therein, impregnating the stacked condensers, and potting the stacked condensers.

3. The method of making condensers, which comprises applying individually to a plurality of rolled condensers sufficient pressure to flatten them into stable shapes, heating the condensers sufficiently to remove most of the moisture in the condensers while the condensers are subjected to said pressure, releasing said pressure, assembling under pressure the condensers while they are still hot in combinations of a predetermined capacity, heating the stacked condensers in vacuum, impregnating the stacked condensers in vacuum, and potting the stacked and impregnated condensers.

4. The method of making condensers, which comprises applying to a plurality of rolled condensers sufficient pressure to flatten them into stable shapes, heating the condensers sufficiently to remove most of the moisture in the condensers while the condensers are subjected to said pressure, releasing said pressure, assembling under pressure the condensers permanently in a combination in which they are to be used while they are still hot in a combination of a predetermined capacity, heating the assembled condensers in vacuum, impregnating the assembled condensers in vacuum, and potting the assembled and impregnated condensers.

DALE R. CLEMONS.

References Cited in the file of this patent

UNITED STATES PATENTS

| Number | Name | Date |
|---|---|---|
| 1,058,397 | Wood | Apr. 8, 1913 |
| 1,594,124 | Schrader | July 27, 1926 |
| 1,674,641 | Halliwell | June 26, 1928 |
| 1,721,503 | Priess | July 23, 1929 |
| 1,849,885 | Priess | Mar. 15, 1932 |
| 2,181,695 | Given | Nov. 28, 1939 |